US008031209B2

(12) United States Patent  (10) Patent No.: US 8,031,209 B2
Sadler  (45) Date of Patent: Oct. 4, 2011

(54) GRAPHICAL DISPLAY SYSTEM AND METHOD

(75) Inventor: Mark L. Sadler, Harvard, IL (US)

(73) Assignee: The Boeing Company, Chicago, IL (US)

(*) Notice: Subject to any disclaimer, the term of this patent is extended or adjusted under 35 U.S.C. 154(b) by 965 days.

(21) Appl. No.: 12/001,297

(22) Filed: Dec. 11, 2007

(65) Prior Publication Data

US 2009/0147024 A1    Jun. 11, 2009

(51) Int. Cl.
*G09G 5/00*    (2006.01)
(52) U.S. Cl. ........ 345/629; 345/660; 345/592; 345/677; 345/168; 382/128; 382/132; 382/284; 382/294; 340/958; 340/961; 340/967; 340/973; 340/974
(58) Field of Classification Search .................. 345/168, 345/660, 592, 677, 629; 382/128–132, 284, 382/294; 340/958–961, 967, 973–974
See application file for complete search history.

(56) References Cited

U.S. PATENT DOCUMENTS

| | | | | |
|---|---|---|---|---|
| 3,574,283 | A * | 4/1971 | Albers | 73/178 R |
| 5,555,175 | A * | 9/1996 | D'orso | 701/5 |
| 6,054,937 | A * | 4/2000 | Von Viebahn et al. | 340/961 |
| 6,822,624 | B2 * | 11/2004 | Naimer et al. | 345/9 |
| 6,867,711 | B1 * | 3/2005 | Langner et al. | 340/979 |
| 6,995,690 | B1 * | 2/2006 | Chen et al. | 340/974 |
| 7,729,523 | B2 * | 6/2010 | Hammond | 382/128 |
| 7,848,553 | B2 * | 12/2010 | Hertel et al. | 382/128 |
| 2002/0180947 | A1 * | 12/2002 | Pierrat | 355/77 |
| 2003/0026469 | A1 * | 2/2003 | Kreang-Arekul et al. | 382/132 |
| 2003/0063105 | A1 * | 4/2003 | Agnew | 345/660 |
| 2005/0024237 | A1 * | 2/2005 | Gannett | 340/967 |
| 2005/0031176 | A1 * | 2/2005 | Hertel et al. | 382/128 |
| 2005/0111757 | A1 * | 5/2005 | Brackett et al. | 382/294 |
| 2005/0129299 | A1 * | 6/2005 | Kreang-Arekul et al. | 382/132 |
| 2005/0213849 | A1 * | 9/2005 | Kreang-Arekul et al. | 382/284 |
| 2005/0270311 | A1 * | 12/2005 | Rasmussen et al. | 345/677 |
| 2005/0285878 | A1 * | 12/2005 | Singh et al. | 345/633 |
| 2006/0238511 | A1 * | 10/2006 | Gyde et al. | 345/168 |
| 2006/0250280 | A1 * | 11/2006 | Chen et al. | 340/974 |
| 2007/0241936 | A1 * | 10/2007 | Arthur et al. | 340/958 |

(Continued)

OTHER PUBLICATIONS

Spaghetti Charts. Jeppesen's Private Pilot Training Manual © Jeppesen Sanderson, Inc. 1997-2004, 3 pages.

*Primary Examiner* — Jin-Cheng Wang
(74) *Attorney, Agent, or Firm* — Harness, Dickey & Pierce, P.L.C.

(57) ABSTRACT

A method for displaying an operating parameter for a mobile platform. A plurality of different graphs can be digitized to place them in electronic form. Each graph represents a different operational or environmental characteristic relating to operation of the mobile platform, and each is further related to a common parameter. A first one of the digitized graphs is selected by a user. A user positionable marker is displayed on the first digitized graph at a specific, user selected location on the first digitized graph. Next a second one of the digitized graphs is selected. The second one of the digitized graphs is then overlayed over at least a portion of the first digitized graph, with the marker remaining visible and superimposed on the second digitized graph, and without having moved relative to the first digitized graph. The second digitized graph is then aligned relative to the first digitized graph. The marker is then used to assist in reading information from the second digitized graph.

18 Claims, 6 Drawing Sheets

U.S. PATENT DOCUMENTS

| | | | |
|---|---|---|---|
| 2008/0018659 A1* | 1/2008 | Aspen | 345/592 |
| 2008/0022217 A1* | 1/2008 | Aspen | 715/764 |
| 2008/0300735 A1* | 12/2008 | He | 701/3 |
| 2009/0207048 A1* | 8/2009 | He et al. | 340/973 |

* cited by examiner

GRAPHICAL DISPLAY SYSTEM AND METHOD

FIELD

The present disclosure relates to systems for assisting mobile platform operators in determining a needed operating parameter, and more particularly to a system and method that enables an airborne mobile platform operator to overlay and align two or more graphs of performance characteristics of the mobile platform on a display screen to more easily and quickly determine a needed operational parameter.

BACKGROUND

The statements in this section merely provide background information related to the present disclosure and may not constitute prior art.

With airborne mobile platforms such as aircraft, there is often a need to determine flight related information from a plurality of graphs or charts. Typically the graphs or charts are in paper form. Often the pilot (and/or co-pilot) may need to analyze two, three or more charts or graphs in order to be able to determine needed flight information. Often a first graph or chart must be manually aligned with a curve on a second graph or chart, and while holding the first and second charts in aligned fashion, then sometimes a third graph or chart (and sometimes even further charts or graphs) must be aligned relative to the second chart, before the needed flight information can be obtained.

As will be appreciated, the use paper charts, and especially the need to physically align or position several paper charts relative to one another to determine a needed parameter of operation of the mobile platform, can be quite cumbersome. Such a procedure can also add significantly to the workload of a pilot and/or co-pilot when the mobile platform is a commercial aircraft, and also to the time needed to perform preflight checks. The use of paper charts can sometimes be made even more difficult when trying to physically maneuver and align several pieces of paper in the confines of a space-limited area, for example within a cockpit of an aircraft.

SUMMARY

The present disclosure is directed to a system and method for more easily and conveniently determining and displaying an operating parameter for a mobile platform. In one implementation the method comprises digitizing a plurality of different graphs, with each graph representing a different operational or environmental characteristic, and each graph being related to a common parameter. A user selects a first one of the digitized graphs. The user then positions a marker on the first digitized graph at a specific, user selected location on the first digitized graph. The user then selects a second one of the digitized graphs. The user manipulates the second digitized graph over at least a portion of the first digitized graph, while the marker remains visible and superimposed on the second digitized graph and without having moved relative to the first digitized graph. The user then aligns the second digitized graph relative to the first digitized graph. The user then uses the marker to assist in reading the second digitized graph. Throughout the process of selecting and aligning the graphs the marker remains visible and superimposed over the last-selected graph.

In one implementation the marker may comprise a reticle. The operation of aligning the second graph relative to the first may include using a user controlled device that enables the second digitized graph to be dragged on a display screen so that it overlays the first digitized graph in a desired manner.

In another implementation the user is able to select three or more digitized graphs and two or more markers, where the second digitized graph can be overlayed on the first graph without obstructing the first marker, and the third digitized graph can be overlayed on the second graph without obstructing a second marker. Accordingly, all of the markers may remain visible, superimposed on top of all of the selected graphs, throughout the process of selecting and aligning the graphs.

In one embodiment the system of the present disclosure may make use of a mouse or touch sensitive device to select and drag digitized graphs over a display screen into needed alignment with one another. The marker may be displayed as a reticle. Any other suitable marker, icon or indicia may also be used in place of a reticle, provided the marker allows a specific location on each graph to be clearly marked.

The system and method significantly reduces the time, inconvenience and workload required of a mobile platform operator in obtaining needed operating information from a plurality of graphs containing performance or environmental related information. The system and method is especially valuable in applications involving commercial or military aircraft, where three, four or more graphs often need to be analyzed in relation to one another to determine critical flight information.

It will also be appreciated that one could use the present system and method to work backwards, for example to find a maximum payload, if one knows the needed runway length.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application or uses.

Figure 1:
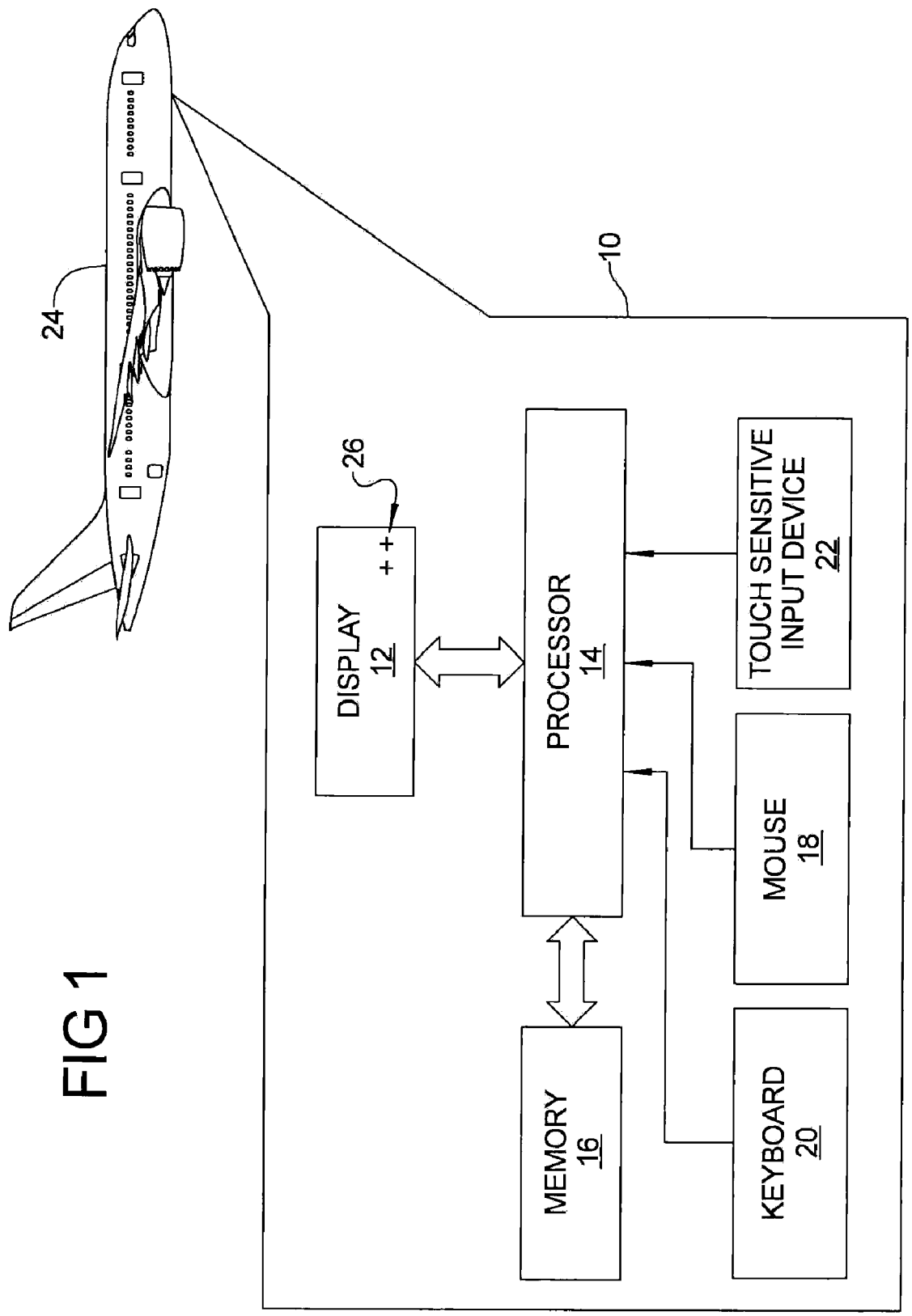
FIG. 1 is a high level block diagram of one embodiment of the hardware for implementing the system and method of the present disclosure.

Referring to FIG. 1, there is shown a system 10 in accordance with the present disclosure. The system 10 in this embodiment may include a display 12, a processor 14, a memory 16 for holding a plurality of digitized graphs, a first user input 18 in the form of a mouse, an optional second user input 20 in the form of a keyboard, and an optional third user input 22 in the form of a touch sensitive pad. The system 10 may be implemented on any form of mobile platform, for example a commercial or military aircraft 24, a rotorcraft, a marine vessel, or any form of land vehicle such as a bus, van, truck, car, etc. The system 10, while having particular applicability to the aviation industry, could just as readily be used in non-mobile environments, such as within an office or any other terrestrial-based setting where there is a need to sequentially analyze several graphs to obtain needed information from the graphs. Merely for convenience, the following discussion will center on the mobile platform taking the form of the aircraft 24, and the digitized graphs will relate to operational or environmental information needed for operating the mobile platform, such as for performing takeoffs, landings, etc.

The processor 14 receives inputs from one or more of the input devices 18, 20 and 22 and uses these inputs to select one or more digitized graphs that are stored in the memory 16. In practice, only a single one of the input devices 18, 20, 22 will typically be needed, but specific applications may arise where it is advantageous to provide the user with a plurality of different input devices to select from. For the purpose of discussion, it will be assumed that the mouse 18 is the only input device required for using the system 10.

The display 12 may display portions of a plurality of digitized graphs that can be selected by the user using the mouse 18. The mouse 18 also enables the user to drag (i.e., align and position) the selected graph to a precise location on the display 12. This will be described in further detail in connection with FIG. 2. The processor 14 obtains the needed digital information from the memory 16, as selected by the mouse 18, and transfers the digital information to the display 12. The mouse also enables the user to select one or more markers, in this example reticles 26 (FIG. 2), that can be superimposed over the previously selected graph. While reticles 26 are employed, it will be appreciated that any other type of marker or indicia could be employed. For example, a bullseye, a circle, a triangle, square, etc. could be used, just to name a few. However, when working with graphs, it is anticipated that the use of reticles may be more preferable, in view of the ability of a reticle to visually denote a highly precise location on a graph.

Figure 2:
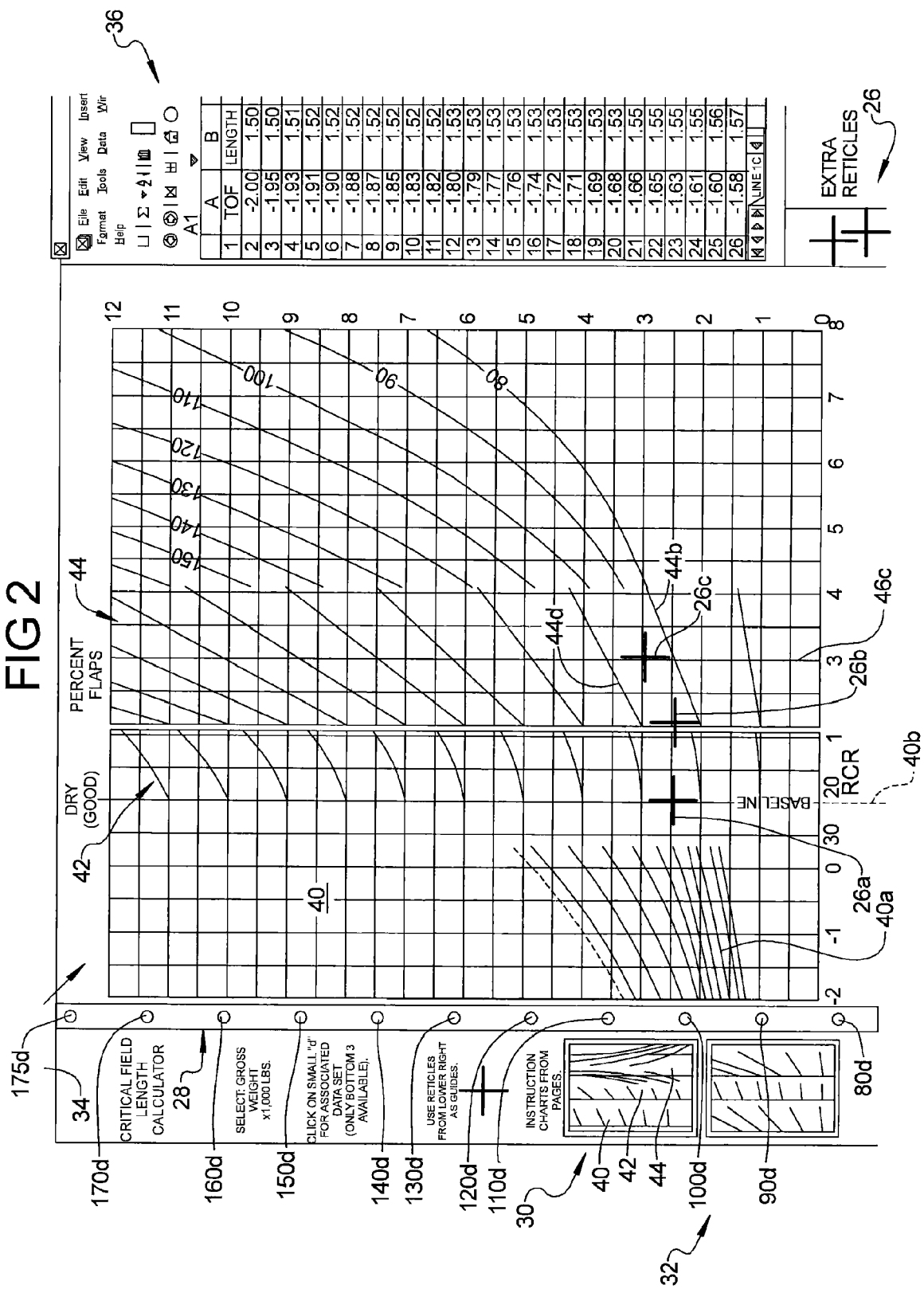
FIG. 2 is a view of a display screen showing three independent graphs being overlayed, with the use of three reticles, to assist in aligning the graphs and reading information from the third graph (i.e., topmost overlayed graph)

Referring to FIG. 2, one specific example of using the system 10 will now be described with respect to determining a minimum runway length needed for an aircraft to take-off from. In this example the display 12 is shown with a plurality of digitized graphs presented thereon in overlayed fashion. A field 28 is presented for a plurality of different options for selecting a specific gross vehicle weight of the aircraft 24. Fields 30 and 32 may be used to display thumbnail illustrations of the available digitized graphs or charts (or just portions thereof), which may be selected by the user and dragged onto a main display area 34 of the display. A spreadsheet field 36 may be presented where precise X and Y values representing specific operational or environmental parameters may be displayed that correspond to specific locations along a specific graph. In this example, "TOF" stands for "take-off factor" while the numbers in the adjacent column represent a minimum runway length factor. For example, directly under the label "Length" in the spreadsheet field 36, the number 1.5 means that a runway length of 1500 ft. (455 meters) is required when using a TOF of −2.0. Reticles 26 are positioned below the spreadsheet field 36, but could be displayed for selection virtually anywhere on the display 12 outside the main display area 34.

In operation the user first may select the appropriate gross vehicle weight of the aircraft 24 by using the mouse 18 to click on the "100" circle within field 28. In this example, such a selection indicates a gross vehicle weight of 100,000 lbs (45,454 kg). By "gross weight" it is meant the close approximate weight of the aircraft 24 (FIG. 1) fully loaded with fuel, all passengers and all passenger luggage or cargo.

Next the user would select a first one of the digitized graphs displayed in either one of thumbnail fields 30 or 32. This first selected graph may be viewed as forming a "base graph" onto which subsequently selected graphs will be overlayed. For example, the user may select the graph shown in full in FIG. 3, "Take-Off Factor vs. Uncorrected Critical Field Length—1,000 feet", labeled with reference number 40, as the base graph. At least a portion of graph 40 may be displayed, for example, in field 30. Graph 40 is selected by using the mouse 18 to drag and drop a copy of it from field 30 onto the main display area 34. For the gross aircraft weight selected, the system 10 may automatically highlight the third curve from the bottom in graph 40, labeled 40a in FIG. 3, as the curve that needs to be considered for that specific gross weight of aircraft. It will be appreciated that two or base graphs could be present, depending on the specific application and/or type of information being calculated.

Figure 3:
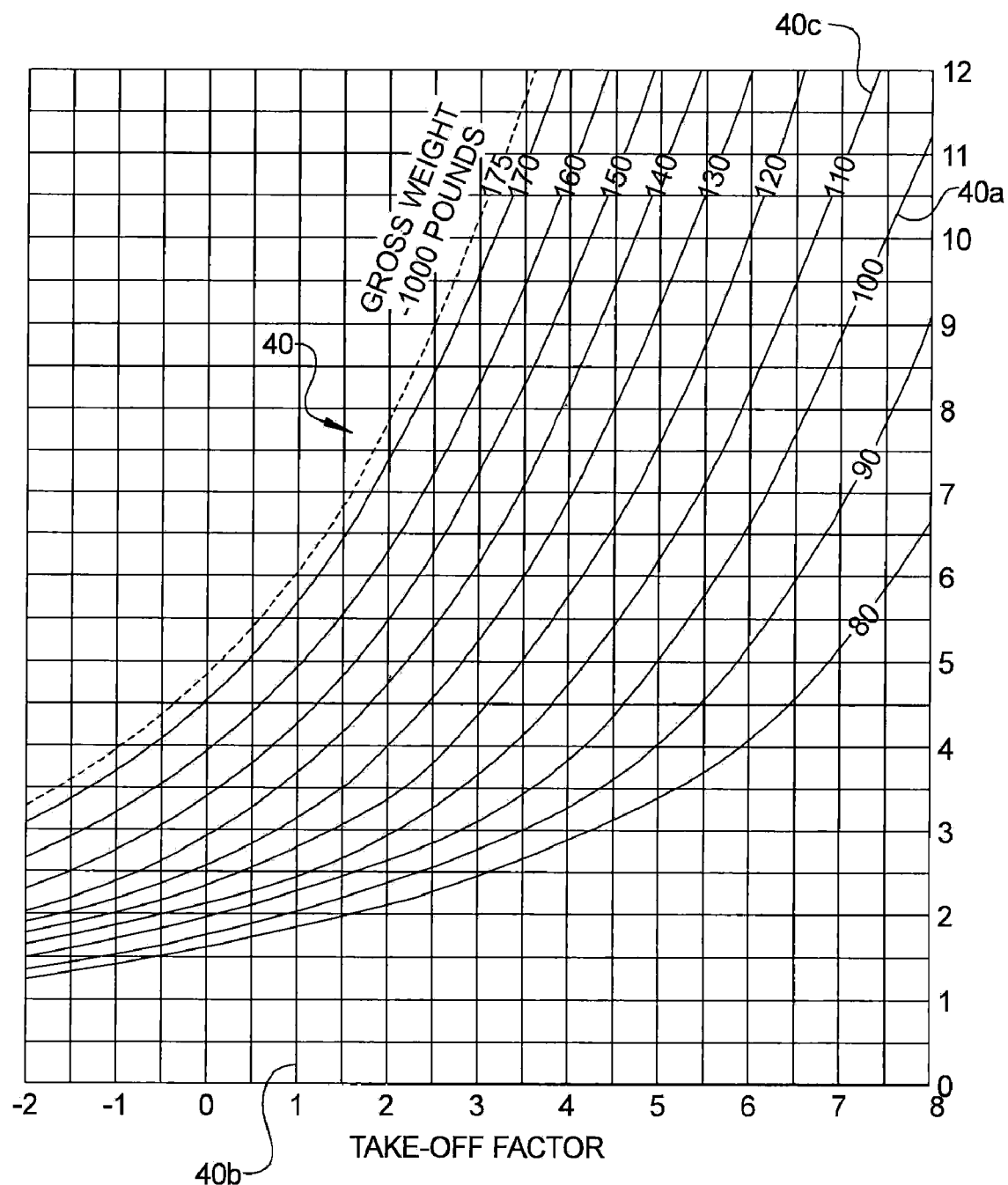
FIG. 3 is an illustration of just the first digitized graph that is being overlayed in FIG. 2.

Next the user would use the mouse 18 to drag one of the reticles 26, in this instance a reticle labeled 26a, onto curve 40a of the graph 40, and to position it on the curve 40a at the ordinate denoting a take-off factor value of "1" (labeled 40b in FIG. 3). The reticle 26a is effectively superimposed over the graph 40.

Figure 4:
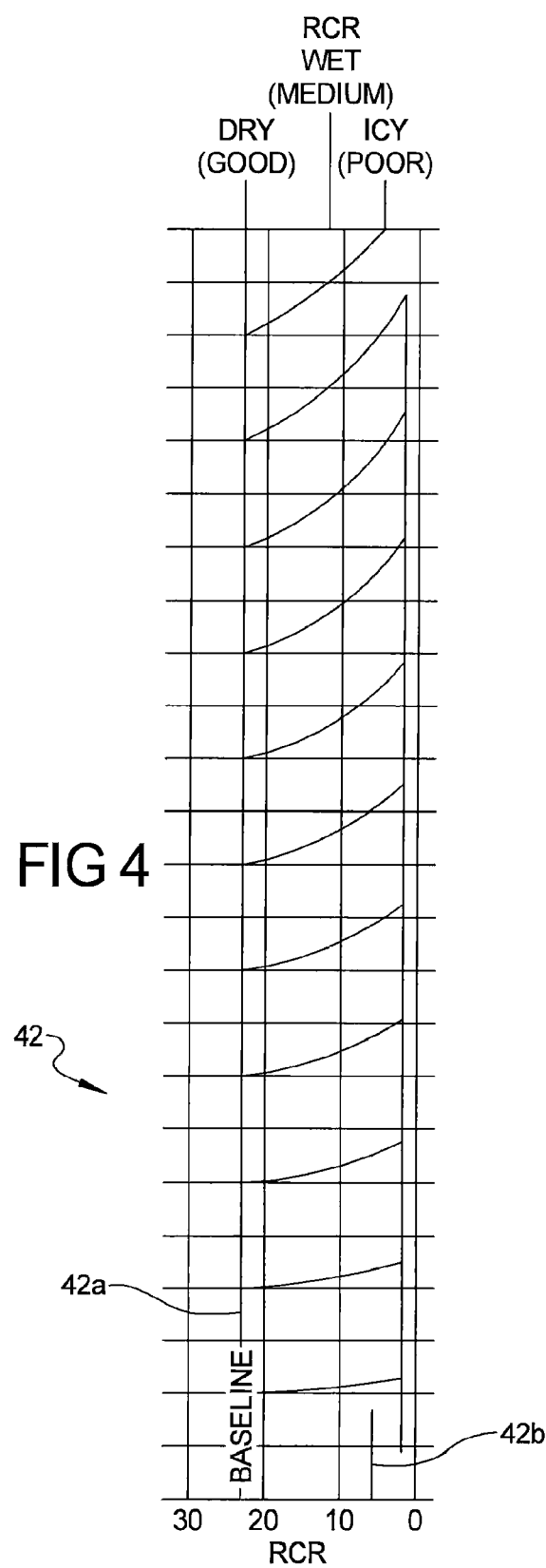
FIG. 4 is an illustration of just the second digitized graph that is overlaying the first graph in FIG. 2.

The user then uses the mouse 18 to drag and drop a second digitized graph, for example a "Runway Condition Reading" graph labeled 42, and illustrated in thumbnail form in field 30 (and in full in FIG. 4), onto the main display area 34. It will be appreciated that the reticle 26a "floats" above both the first graph 40 and the second graph 42 as the second graph 42 is being positioned relative to the first graph 40. The user aligns a "baseline" ordinate 42a of the second graph 42 with the ordinate 40b that denotes a take-off factor of "1". The X-axis of the graphs 40 and 42 are also aligned such that the X-axis of the second graph 42 lies directly over the X-axis of the first graph 40.

The user then selects a second reticle 26b and drags it onto the main display area 34. The second reticle 26b is positioned an equal distance above the curve 40a to match the relative vertical distance at which the first reticle 26a sits between curve 40a and the curve 40c above it. The second reticle 26b is also positioned at the ordinate representing the "6" value on the second (RCR) graph 42 (labeled 42b in FIG. 4), meaning in this example that the runway is icy and in generally poor condition. The second reticle 26b also "floats" above the second graph 42. Thus, while overlaying the second graph 42 over a portion of the first graph 40 obscures a portion of the first graph, the reticles 26a and 26b still remain visible at all times.

Referring further to FIG. 2, the user then uses the mouse 18 to drag and drop a third graph 44 from the thumbnail field 30 onto the main display area 34. It will be appreciated that all of the graphs used with the present disclosure are prepared to a common desired scale to enable overlaying them during the presently described process. It will also be appreciated that the use of thumbnail fields 30 and 32 to display thumbnail illustrations of various graphs is optional. Any other means to enable selection of the various graphs available may be employed.

Figure 5:
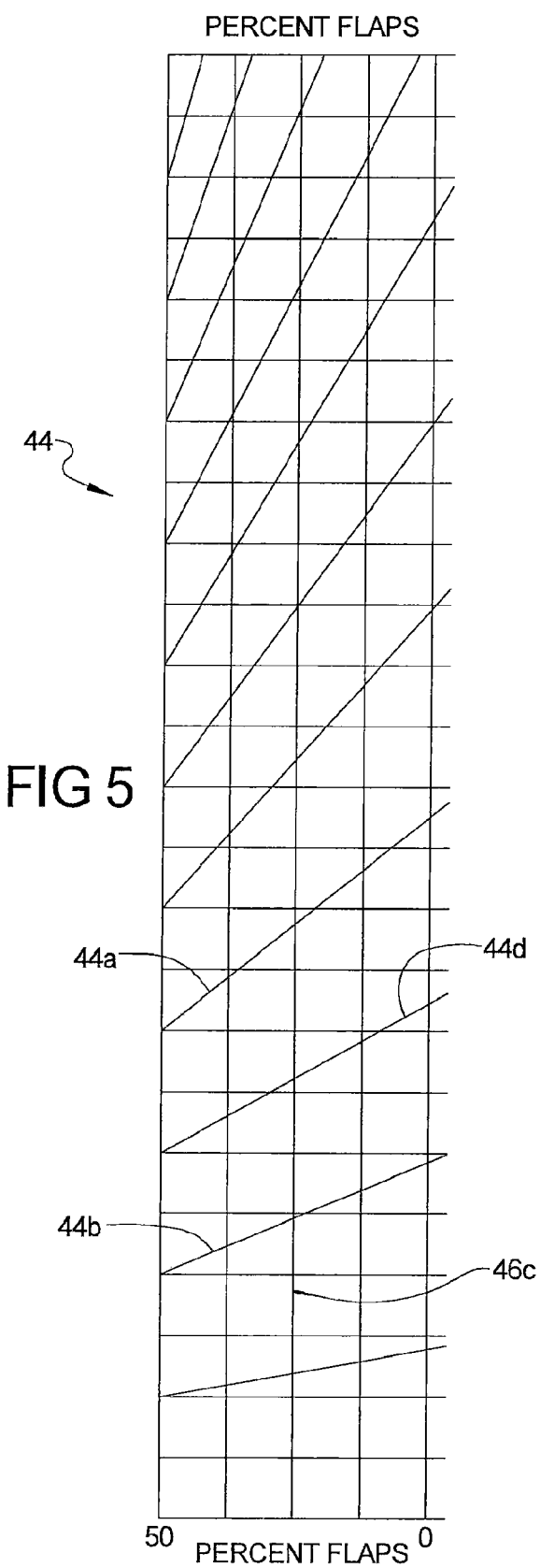
FIG. 5 is an illustration of just the third digitized graph that is overlaying the second digitized graph in FIG. 2.
Figure 6:
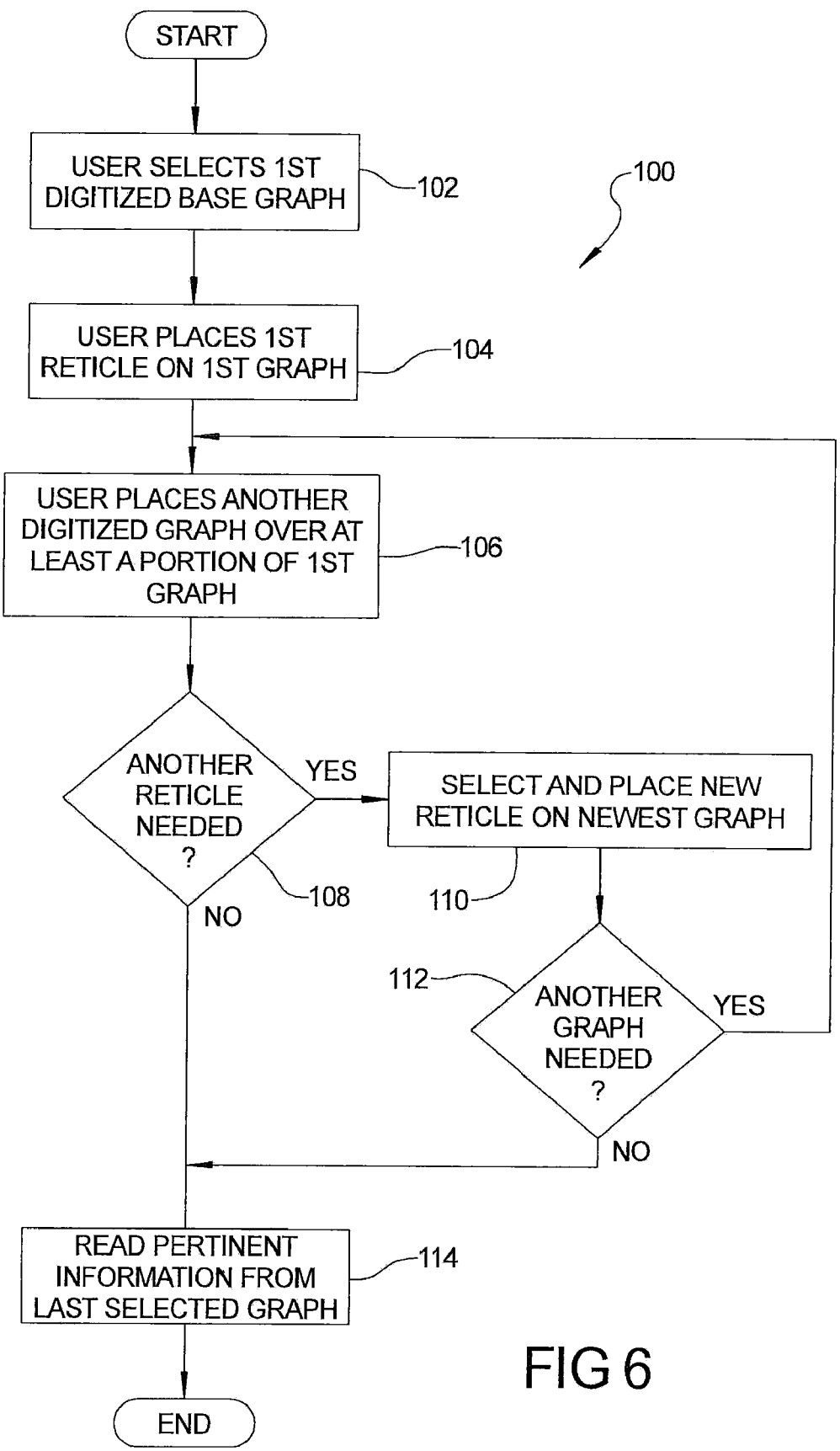
FIG. 6 is a flowchart of the operations performed by a user in executing a method in accordance with the present disclosure.

The third graph 44 in this example is a "Percent Flaps" graph indicating the percentage of fully deployed flaps that should be employed during the take-off operation. Graph 44 is shown in full in FIG. 5. The user also uses the mouse 18 to position the third graph 44 over the second graph 42 so that the ordinate denoting "50%", labeled 44a in FIG. 5, is positioned directly over the second reticle 26b (i.e., directly over the ordinate of the second reticle 26b). The X-axis of the third graph 44 is also aligned during this process with the X-axis of the first and second graphs 40 and 42. Again, the third graph 44 overlays a portion of the second graph 42, as well as a portion of the first graph 40, but the reticle 26b continues to "float" over the graph 44. At this point the processor 14 may populate the display 14 with an additional 1, 2 or more reticles 26 that can be selected by the user. Alternatively, any number of reticles 26, for example 3, 4 or 5 may be displayed on the main display area 34 before any graphs are selected. The precise number of available reticles 26 that are displayed may be programmed into the processor 14 during manufacture of the system 10.

Referring further to FIG. 2, the user then uses the mouse 18 to select and drag a third reticle 26c onto the main display area 34 and positions it over the third graph 44 at a point just above the second from bottom curve 44b, and vertically aligned with the ordinate 46c denoting "25%" flaps in FIGS. 2 and 5. The third reticle 26c is positioned above the curve 44b (and on ordinate 44c) to match the relative vertical distance by which the second reticle 26b sits between curve 44b and the curve above it (labeled curve 44d in FIGS. 2 and 5). Again, the first reticle 26a, second reticle 26b and third reticle 26c all remain visible throughout this process of overlaying graphs one on top of another.

The Y-axis component of the third reticle 26c represents the minimum runway length needed for the RCR condition of "6", with flaps at 25%, a take-off factor of "1" and a gross aircraft weight of 100,000 lbs. In this example that distance is approximately 2900 feet. The spreadsheet field 38 of the display 14 may be used to display the RCR factor (i.e., from which to calculate minimum runway length) that would be needed, under the above explained conditions, for each of a plurality of different take-off factors.

The overlaying of the graphs 40, 42 and 44 thus enables a pilot or co-pilot to determine a minimum needed runway length for the specific environmental condition affecting the runway, while taking into consideration the percentage of flaps used, the take-off factor employed and the gross weight of the aircraft.

It will be appreciated that FIG. 2 is merely one example of the types of graphs that may be utilized by the system 10. Other various aviation graphs/charts that may be employed, without limitation, are "Drag Index", "Runway Slope Percent", "Wind Velocity Tail/Head Knots vs. Partially Corrected Field Length (in feet)", "Anti-Skid Operative" and "RSC Slush or Water vs. Partially Corrected Critical Field Length", just to name a few. From the above, it will be appreciated that instances may arise where more than three independent graphs will need to be overlayed or juxtaposed to determine an operating parameter for an aircraft, and the present system 10 and method enables virtually any number of independent graphs to be overlayed one on top of another to accomplish this. Alternatively, thin horizontal lines or bars, each having an arrow thereon, could be employed in place of the reticles, with the last line or bar being used to assist the user in reading the Y-axis component of the graph 40.

As will be apparent, the ability of the reticles 26a and 26b to "float" over the graphs 40, 42 and 44 enables a much more compact presentation of the graphs. Without the system 10 and method of the present disclosure, graphs 40, 42 and 44 would need to be manually overlayed, with pencil marks being made on the graphs in place of the reticles 26a, 26b and 26c, and the graphs held carefully in alignment. This could necessitate a significant amount of space, as each of the graphs 40, 42 and 44 are often presented on 8.5 inch by 11 inch or larger sheets of paper. As can be appreciated, when 2, 3, 4, 5 or more graphs must be employed to determine an operating parameter, the manipulation and handling of the paper representing each graph becomes cumbersome and can require a good amount of work space. The workload imposed on the operator(s) of the mobile platform can also be significantly increased when trying to use paper graphs. Thus, the system 10, while not only significantly easing the manner of reading and manipulating the various graphs displayed, also enables the process of using the graphs to be accomplished within a confines of a space constricted area, such as a cockpit of an aircraft. It is a further significant advantage of the present system 10 and method that the above described process of determining needed operational information is made essentially "paperless". The system 10 also simplifies any required verification by the pilot and/or co-pilot. Furthermore, the system 10 is easy for pilots and co-pilots to learn and use and requires only minimal training time to learn.

Referring to FIG. 5, a flowchart 100 of the operations performed by a user is presented. At operation 102 the user selects a first digitized base graph from the display 14 using the mouse 18. At operation 104 the user then places a reticle 26 on the display 14 at a desired point on the first graph. At operation 106 the user places a second graph over at least a portion of the first graph and aligns the second graph relative to the reticle previously placed on the first graph, and also relative to the first graph. At operation 108, if another reticle is needed then it is placed on the newest (i.e., last selected) graph, as indicated at operation 110. If another graph is needed, as checked for at operation 112, then operations 108, 110 and 112 are repeated. If no additional graphs are required, then the pertinent information is obtained using the last selected reticle and last selected graph, as indicated at operation 114, and the process thereafter ends.

The system 10 and method thus significantly eases the burden of handling numerous paper charts and manipulating the charts to extrapolate needed operational information. The elimination of the need to use paper charts also can significantly expedite the process of having to analyze several charts while trying to hold them in a precise alignment, and is expected to help reduce errors in reading the graphs. Also the system and method could be used in reverse order, for example to find a maximum payload weight if one knows the critical runway length value.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method implemented using a processor for displaying an operating parameter for a mobile platform, comprising:
digitizing a plurality of different graphs, with each said graph representing a different operational or environmental characteristic and being related to a common parameter, and storing the plurality of different, digitized graphs in a memory;

selecting a first one of said digitized graphs that corresponds to a first operational consideration for the mobile platform, the first digitized graph being displayed on a display;

displaying a user positionable marker on said first digitized graph at a specific, user selected location on said first digitized graph;

selecting a second one of said digitized graphs from the memory that corresponds to a second operational consideration for the mobile platform;

overlaying said second one of said digitized graphs over at least a portion of said first digitized graph on said display, with said marker remaining visible and superimposed on said second digitized graph and without having moved relative to said first digitized graph;

aligning said second digitized graph relative to information on said first digitized graph such that said information remains visible on said first digitized graph; and using said marker to assist in reading said second digitized graph.

2. The method of claim 1, wherein digitizing a plurality of different graphs comprises digitizing a plurality of graphs relating to different environmental factors needing to be considered for operation of an aircraft.

3. The method of claim 1, wherein digitizing a plurality of different graphs comprises digitizing a plurality of graphs relating to different performance characteristics of said aircraft and different environmental factors needing to be considered for operation of said aircraft.

4. The method of claim 3, wherein placing a user positionable reticle on said first digitized graph comprises using a mouse.

5. The method of claim 3, wherein placing a user positionable reticle on said first digitized graph comprises using a touch sensitive device pad.

6. The method of claim 1, wherein placing a user positionable marker on said first digitized graph comprises placing a user positionable reticle on said first digitized graph.

7. The method of claim 1, further comprising:
displaying an additional user selected marker on said second graph at a user desired location on said second graph;
selecting a third one of said digitized graphs;
overlaying said third digitized graph over at least a portion of said second digitized graph with said additional marker remaining visible and superimposed on said third digitized graph and without having moved relative to said second digitized graph;
aligning said third digitized graph relative to said second digitized graph; and
using said additional marker to assist in reading said second digitized graph.

8. The method of claim 1, further comprising using a display to display said digitized graphs; and
providing a thumbnail on said display of said digitized graphs from which a user may select from.

9. A method implemented using a processor for displaying an operating parameter for an airborne mobile platform, comprising:
digitizing a plurality of different graphs, with each said graph representing different mobile platform operating characteristics and different environmental characteristics pertinent to operation of said mobile platform, and further all of said different graphs being related to a common parameter, and storing the digitized graphs in a memory;

selecting a first one of said digitized graphs for display on a display system, the display system being responsive to the processor;

using a processor to assist in displaying a user positionable reticle on said first digitized graph at a specific, user selected location on said first digitized graph;

selecting a second one of said digitized graphs from the memory;

using the processor and a user manipulatable device to assist in overlaying said second digitized graph over at least a portion of said first digitized graph, with said reticle remaining visible and superimposed on said second digitized graph and without having moved relative to said first digitized graph;

aligning an axis of said second digitized graph relative to an axis of said first digitized graph, without causing movement of said reticle; and using said reticle to assist in reading information from said second digitized graph; and providing a thumbnail field displayed on the display on which thumbnails of said first and second ones of said digitized graphs are displayed.

10. The method of claim 9, wherein placing a user positionable reticle on said first digitized graph comprises using a mouse to select and move said reticle.

11. The method of claim 9, wherein placing a user positionable reticle on said first digitized graph comprises using a touch sensitive device pad.

12. The method of claim 9, further comprising:
displaying an additional user selected reticle on said second graph at a user desired location on said second graph;
selecting a third one of said digitized graphs;
overlaying said third digitized graph over at least a portion of said second digitized graph with said additional reticle remaining visible and superimposed on said third digitized graph and without having moved relative to said second digitized graph;
aligning an axis of said third digitized graph relative to said axis of said second digitized graph and without causing movement of said reticle; and
using said additional reticle to assist in reading said second digitized graph.

13. The method of claim 9, further displaying information from said second digitized graph in spreadsheet format on the display.

14. A system for use with a mobile platform for displaying performance related and environmental information used for operation of the mobile platform, the system comprising:
a processor:
a memory in communication with said processor for storing a plurality of digitized graphs relating to performance characteristics of the mobile platform and environmental factors to be considered when operating said mobile platform;
a display in communication with said processor for displaying user selected ones of said graphs;
a user control adapted to:
enable a user to select specific ones of said digitized graphs, in a specific order;
to select at least one marker and to position said marker on a previously selected first graph being displayed on said display such that said marker is superimposed over said previously selected first graph without significantly obstructing said previously selected first graph;

to enable a second graph to be subsequently selected graph and positioned over said previously selected first graph, while said marker remains superimposed over said subsequently selected first graph, and without causing movement of said marker;

to place a second marker on said second graph; and to select a third graph and to position the third graph over the second graph while enabling both of said first and second markers to remain visible, to aid a user in interpreting said first, second and third graphs.

15. The system of claim 14, wherein said user control comprises a mouse.

16. The system of claim 14, wherein said user control comprises a touch sensitive input device.

17. The system of claim 14, wherein:

said user control enables said user to drag said subsequently selected graph across said display to be positioned at a desired position overlaying said previously selected graph; and said marker comprises a reticle.

18. The system of claim 14, wherein said display further comprises a thumbnail display of a plurality of graphs able to be selected by a user via said user control.

* * * * *